(12) United States Patent
Connell

(10) Patent No.: US 8,439,566 B2
(45) Date of Patent: May 14, 2013

(54) WEAR PAD ADJUSTMENT ASSEMBLY

(75) Inventor: Stuart A. Connell, Sherman, TX (US)

(73) Assignee: Caterpillar Global Mining Equipment LLC, South Milwaukee, WI (US)

( * ) Notice: Subject to any disclaimer, the term of this patent is extended or adjusted under 35 U.S.C. 154(b) by 485 days.

(21) Appl. No.: 12/720,326

(22) Filed: Mar. 9, 2010

(65) Prior Publication Data
US 2011/0222801 A1 Sep. 15, 2011

(51) Int. Cl.
*F16C 29/12* (2006.01)
*F16C 33/00* (2006.01)

(52) U.S. Cl.
USPC .............................. 384/40; 384/42

(58) Field of Classification Search ............ 384/26, 384/31, 38, 39, 40, 42; 238/282
See application file for complete search history.

(56) References Cited

U.S. PATENT DOCUMENTS

| | | | |
|---|---|---|---|
| 3,028,099 A * | 4/1962 | Molyneux ..................... | 238/317 |
| 3,884,298 A | 5/1975 | Watkins | |
| 3,934,800 A * | 1/1976 | Molyneux ..................... | 238/341 |
| 3,980,144 A | 9/1976 | Roos et al. | |
| 4,280,742 A | 7/1981 | Justman | |
| 4,759,452 A | 7/1988 | Faint et al. | |
| 5,104,141 A * | 4/1992 | Grove et al. ............. | 280/86.753 |
| 5,201,863 A | 4/1993 | Peot | |
| 5,344,072 A * | 9/1994 | Molyneux ..................... | 238/341 |
| 5,833,018 A | 11/1998 | von Gynz-Rekowski | |
| 5,868,212 A | 2/1999 | McManus | |
| 5,988,298 A * | 11/1999 | Cheng et al. ................. | 173/147 |
| 6,068,275 A * | 5/2000 | Chino ..................... | 280/124.112 |
| 6,092,735 A * | 7/2000 | Molyneux ..................... | 238/341 |
| 6,607,247 B2 | 8/2003 | Becker et al. | |
| 6,607,347 B2 | 8/2003 | Burgo | |
| 6,776,247 B1 | 8/2004 | Bassal | |
| 6,805,488 B2 * | 10/2004 | Ito ................................... | 384/45 |
| 7,032,829 B2 * | 4/2006 | Schwarzbich ................ | 238/281 |
| 7,100,709 B2 * | 9/2006 | Bowe et al. .................... | 175/113 |

(Continued)

FOREIGN PATENT DOCUMENTS

| CA | 1228754 | 11/1987 |
|---|---|---|
| EP | 223897 A * | 6/1987 |

(Continued)

OTHER PUBLICATIONS

Machine translation of EP 223897. Jul. 2012.*

(Continued)

*Primary Examiner* — Thomas R Hannon
*Assistant Examiner* — Alan Waits
(74) *Attorney, Agent, or Firm* — Foley & Lardner LLP

(57) ABSTRACT

A cam assembly is provided for adjustment of a drill feed guide wear pad. The cam assembly has an eccentric bushing with a shank portion extending circumferentially about a first axis and defining a bore along a second axis. The second axis is generally parallel and offset from the first axis. The bushing has a head portion extending from the eccentric bushing portion, with the bore extending though the head portion. The bushing is sized for insertion into an aperture of a drill feed guide wear pad, and is rotatable causing the shank portion to engage the aperture of the wear pad to provide a camming action to position the wear pad relative to a drill feed guide. The head portion is shaped to interact with a tool for rotating the bushing.

11 Claims, 5 Drawing Sheets

U.S. PATENT DOCUMENTS

| | | |
|---|---|---|
| 7,293,377 B2 | 11/2007 | Pinther, II et al. |
| 7,371,009 B1 | 5/2008 | Burgess et al. |
| 2007/0227752 A1 | 10/2007 | Voimanen et al. |

FOREIGN PATENT DOCUMENTS

| | | |
|---|---|---|
| EP | 0 519 397 | 10/1996 |
| EP | 0867566 B1 | 12/2002 |
| GB | 2392663 B | 8/2005 |
| JP | 11-036774 | 2/1999 |
| WO | 2008130403 A1 | 10/2008 |

OTHER PUBLICATIONS

International Search Report and Written Opinion for International Application No. PCT/US2011/021077, mail date Jul. 29, 2011, 7 pages.

* cited by examiner

WEAR PAD ADJUSTMENT ASSEMBLY

TECHNICAL FIELD

The invention relates to an adjustment system for wear pads of drill feed guides.

BACKGROUND

Wear pads are used to maintain clearance gaps for parts or assemblies that are mounted to feed guides. A feed guide has many moving parts or assemblies that are attached to it such that they may move lengthwise along the long axis of the feed guide. Examples of the moving parts or assemblies for use with feed guides include rock drill mounting, hose reel or drum assemblies, and dust pots.

Wear pads are placed between the feed guide and the moving parts or assemblies. Wear pads are adjusted the first time the part or assembly is installed onto the feed guide, and are adjusted periodically thereafter to minimize excessive movement of the parts or assemblies. Often, the wear pad is bolted with a pack of shims and then the wear pad is held in place while maintaining a preferred gap in two different directions at once. This process may be difficult or cumbersome and usually requires two workers to make an adjustment.

SUMMARY

In one embodiment, a cam assembly is for adjustment of a drill feed guide wear pad. The cam assembly has an eccentric bushing with a shank portion extending circumferentially about a first axis. The bushing defines a bore along a second axis generally parallel and offset from the first axis. The eccentric bushing has a head portion extending from the eccentric bushing portion with the bore extending though the head portion. The bushing is sized for insertion into an aperture of a drill feed guide wear pad, and the bushing is rotatable causing the shank portion to engage the aperture of the wear pad, thereby providing a camming action to position the wear pad relative to a drill feed guide. The head portion is shaped to interact with a tool for rotating the bushing.

In another embodiment, an adjustment fastener for a drill feed guide wear pad has an eccentric bolt having a head portion, a first shank portion and a second shank portion, with the first and second shank portions offset collinearly. The first shank portion is sized to fit within an aperture of a wear pad, and the second shank portion is sized to fit within the aperture of a mount. The bolt is rotatable such that the first shank portion engages the wear pad and the second shank portion engages the mount aperture thereby providing a camming action caused by the offset to position the wear pad.

In yet another embodiment, a cam assembly for adjustment of a drill feed guide wear pad has an eccentric bushing having a head portion and a cylindrical body portion extending therefrom about a first axis. The head and body portions of the bushing define a bore along a non-collinear second axis of the bushing. The cam assembly has a fastener sized to fit within the bore to connect the eccentric bushing, a wear pad, and a mount. The body portion is sized for insertion into an aperture of the wear pad, and the bushing is rotatable causing the body portion to engage the aperture of the wear pad, thereby providing a camming action to position the wear pad. The head portion is shaped to interact with a tool for rotating the bushing.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
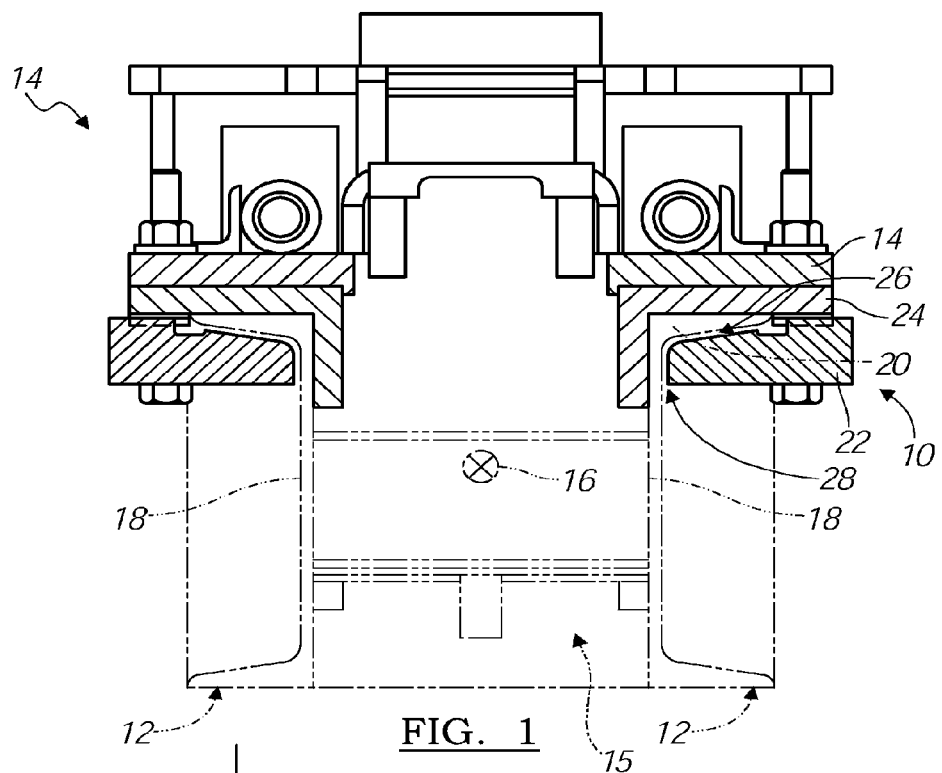
FIG. 1 is a side section view of a wear pad system and feed guide according to the prior art.
Figure 2:
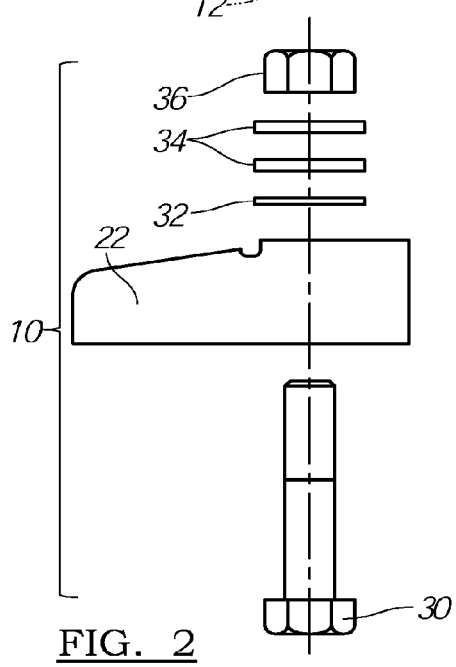
FIG. 2 is an exploded side view of the wear pad adjustment system of FIG. 1.

FIGS. 1 and 2 show a wear pad system 10, feed guide 12, and mounting slide 14 for use with a moving part or assembly 15 according to the prior art. The feed guide 12 has moving parts or assemblies 15 that are connected to the feed guide 12 through a mounting slide 14 to allow the moving parts 15 to move lengthwise along the long axis 16 of the feed guide 12. The moving parts or assemblies 15 may be rock drill mounting, hose reel or drum assemblies, dust pots, or the like. The feed guide 12 has two opposing C-shaped channels 18 which are oriented such that the legs 20 of the C-shaped channels 18 oppose each other.

The wear pad assemblies 10 secure the mounting slide 14 for a moving part 15 to the C-shaped channels 18 of the feed guide assembly 12 such that the slide 14 may move along the feed guide 12 longitudinal axis 16. In one embodiment, the wear pad system 10 has two wear pads, a lower wear pad 22, and an internal wear plate 24, made of a wear resistant material as is known in the art. The wear pads 22, 24 are used to minimize or control the amount of movement of the parts or assemblies 15 attached to the mounting slide 14 along the longitudinal axis 16 by controlling the two gaps 26, 28. The spacing between the feed guide 12 and the lower wear pad 22 provided by gaps 26, 28 allow for a common working axis 16.

FIG. 2 shows the wear pad system 10 according to the prior art. The wear pads 22, 24 are connected to the slide 14 by a traditional bolt 30. The bolt 30 extends through the lower wear pad 22, internal wear plate 24, and through the mounting slide 14. Gap 26 may be adjusted through use of a shim pack 32. A washer 34, bushing or the like may also be present between the lower wear pad 22 and the interior wear plate 24. A nut 36 retains the bolt 30 in place, and an additional washer 34, bushing, or the like may be used between the nut 36 and the mounting slide 14.

Figure 3:
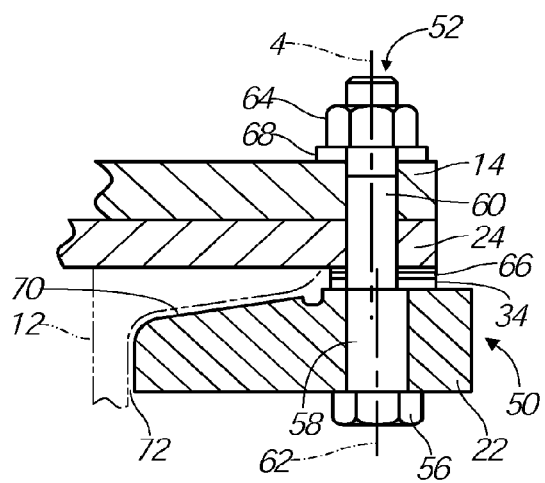
FIG. 3 is a side view of a wear pad adjustment system and feed guide according to an embodiment.

FIG. 3 shows an embodiment of wear pad assembly 50 connected to the mounting slide 14. The wear pad assembly 50 has a bolt 52 or other like fastener as is known in the art that extends through the feed guide assembly 12 along a first axis 54. The bolt has a head 56, a first shank portion 58 and a second shank portion 60. The head 56 and first shank portion 58 is offset and extends along a second axis 62 from the second shank portion 60. At least a portion of the second shank 60 may be threaded such that a nut 64 or the like may be connected to the bolt 52.

The head 56 of the bolt 52 may be hexagonal, socket, adapted for use with a spanner wrench, or the like. The bolt 52 and a shim pack 66 and washer 68 with the desired thickness to provide a gap 70 are used to attach wear pads 22, 24 to the mounting slide 14 to interact with the feed guide 12. The nut 64 is connected to the bolt 52 to retain it in place along with another washer 68. The bolt 52 may be rotated such the first shank portion 58, which is offset from the second shank portion 60 in this case, rotates about the axis 54.

As shown in FIG. 3, the first shank portion 58 thereby interacts with the lower wear pad 22 and provides a camming action to the wear pad 22. The camming action and motion of the first shank portion 58 leads to a corresponding motion in the wear pad 22, thereby allowing for adjustment of the gap 72. Once the gap 72 is adjusted, the nut 64 may be further tightened to retain the wear pad 22 in this position with gap 70, 72 spacing until it is time for another adjustment. Additional adjustments may be made by loosening the nut 64, rotating the bolt 52 to provide a camming action to move the wear pad 22, and then retightening the nut 64. The wear pad assembly 50 may simplify the adjustment of wear pads 22 used to maintain clearance gaps for parts or assemblies mounted to feed guides.

For example, the wear pad 22 is adjusted in a lateral direction by turning the hex head part 56 of the bolt 52. In one embodiment, the nut 64 on the wear pad assembly 50 is hand tightened, then the bolt 52 rotated by a wrench, thus moving the wear pad 22 in the lateral direction, in or out, to set a desired gap 72.

In another embodiment, wear pad assembly 50 is designed such that the both the lower wear pad 22 and the internal wear plate 24 are adjusted simultaneously. The first shank portion 58 on the bolt 52 is designed to engage and interact with both the lower wear pad 22 and internal wear plate 24 along the second axis 62. The second shank portion extends through and engages the mounting slide 14. As the bolt 52 is rotated, the first shank portion 58 rotates about the first axis 54 to provide a camming action to the wear pad and plate 22, 24, thereby repositioning the wear pad and plate with respect to the mounting slide 14 and the feed guide 12.

In another embodiment, the first shank portion 58 on the bolt 52 is divided into a lower portion and an upper portion. The lower portion engages and interacts with the lower wear pad 22, while the upper portion engages and interacts with the internal wear plate 24. The lower and upper portions may be offset along two axes and therefore provide for a phased motion of the wear pad 22 and plate 24, for example to adjust one inwardly and the other outwardly at the same time. Alternatively, the lower and upper portions may lie along the same axis, but have different diameters, such that the wear pad 22 and wear plate 24 are adjusted in the same direction, but by differing distances.

Figure 4:
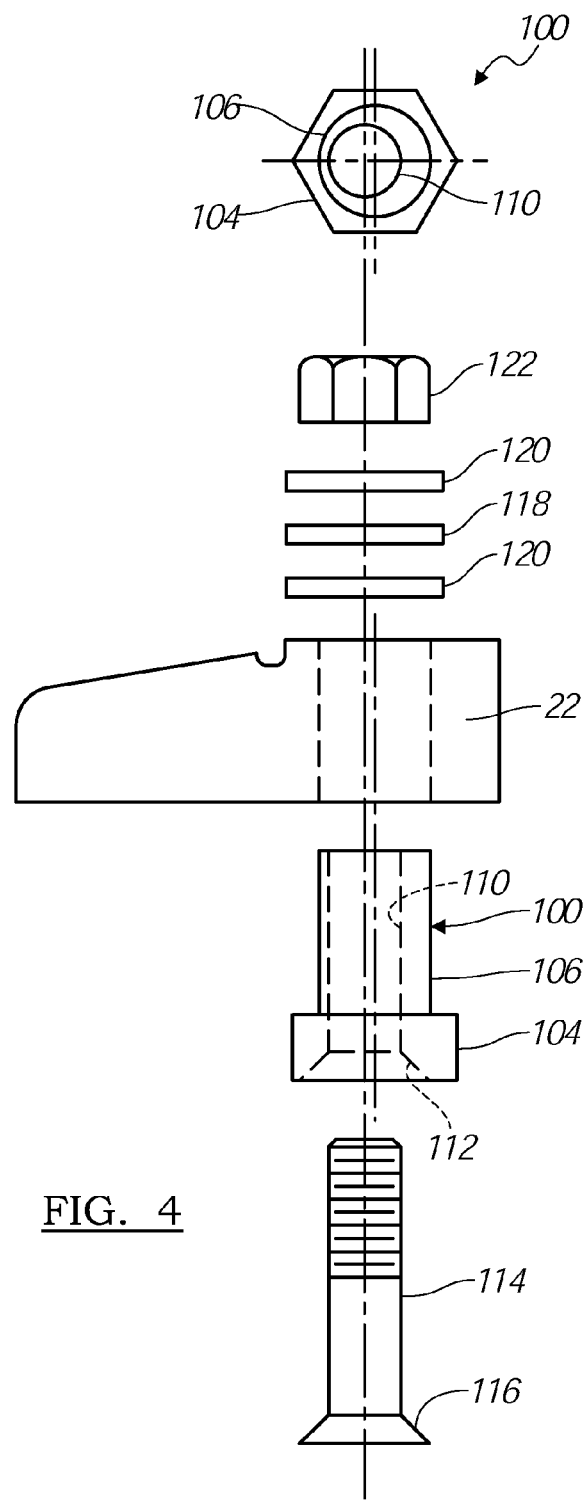
FIG. 4 is a side view and a top view of the wear pad adjustment system.
Figure 5:
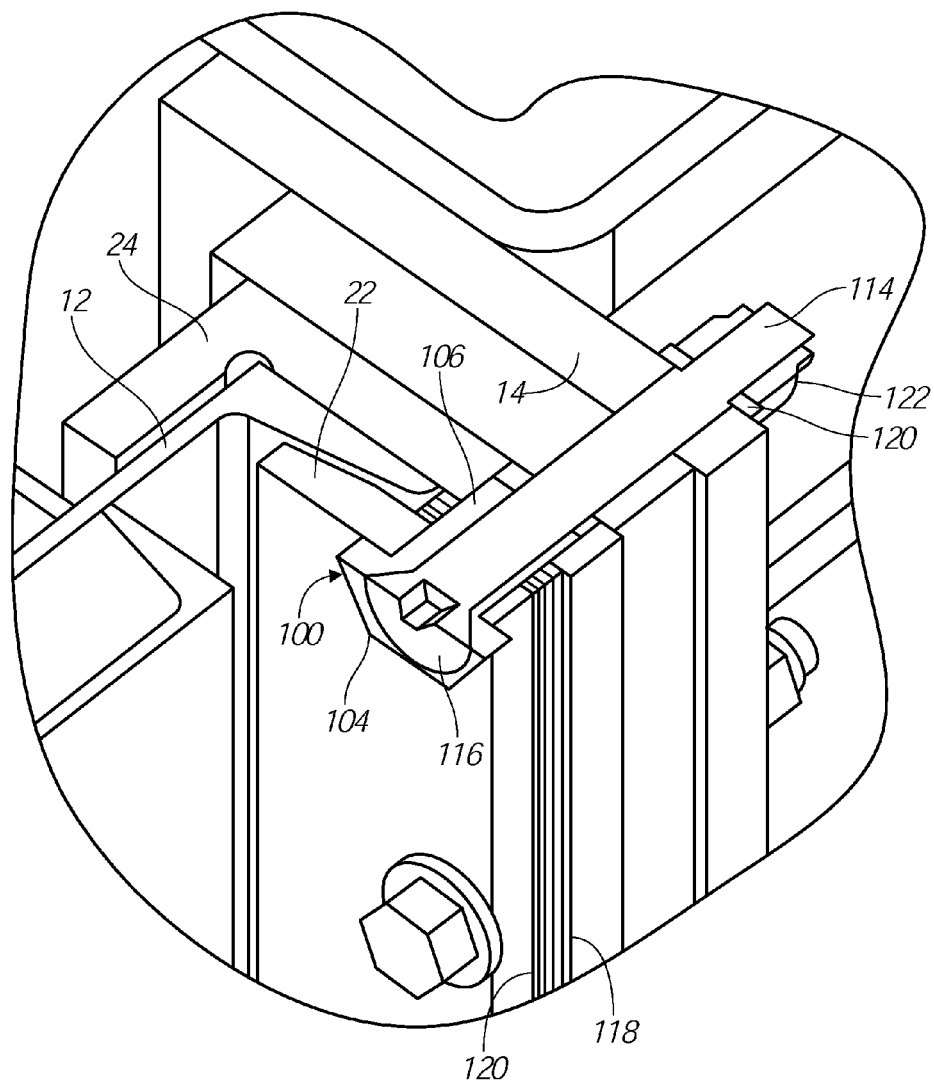
FIG. 5 is a perspective view of a wear pad adjustment system and feed guide of FIG. 4.
Figure 6:
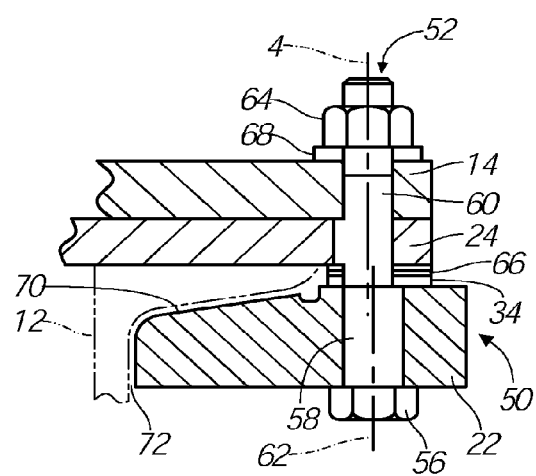
FIG. 6 is a side view of a wear pad adjustment system and feed guide according to another embodiment.
Figure 7:
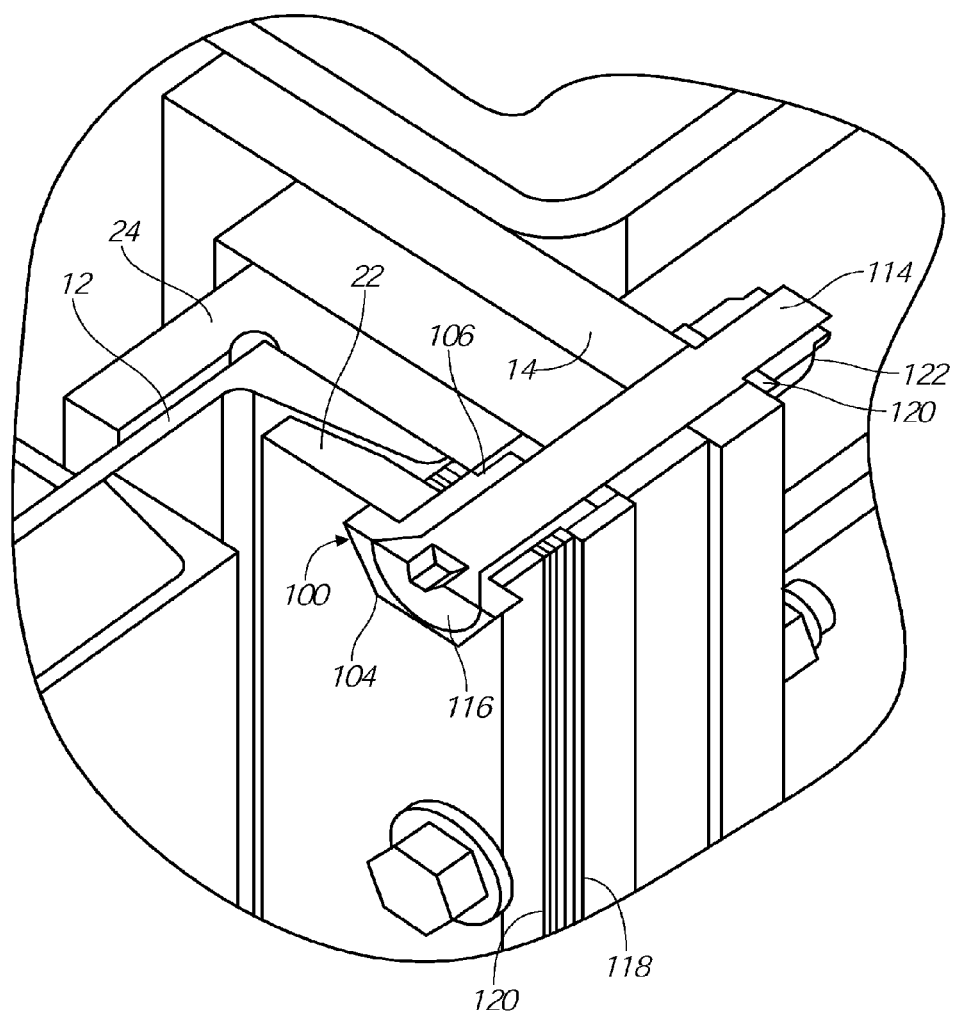
FIG. 7 is a perspective view of a wear pad adjustment system and feed guide according to yet another embodiment.

FIGS. 4-5 depict another embodiment of a bushing 100 for use with a wear pad assembly 102 and feed guide 12. The bushing 100 shown in FIG. 4 is eccentric with a head 104 and a body 106 extending along a longitudinal axis 108. The head 104 may be hexagonal for use with a wrench, or have other head shapes as are known in the art. A bore 110 is oriented longitudinally off-axis though the bushing 100, such that the bore 110 is offset from the longitudinal axis 108 of the bushing 100 to create the eccentricity. The bore 110 may also have a countersink 112 located on the head 104.

An example of the eccentric bushing 100 and wear pad assembly 102 in use with a feed guide 12 is shown in FIG. 5.

The body 106 of the bushing 100 is inserted through apertures in the wear pads 22, 24. A bolt 114 or other fastener is inserted through the bore 110 in the bushing 100 and connected to the mounting side 14. The head 116 of the bolt 114 fits into the countersink 112 in the bushing 100. A shim pack 118 and washers 120 may be used to adjust gaps and provide smoother rotation of the wear pads 22, 24 during adjustment. A nut 122 or the like is affixed to a threaded end of the bolt 114. The wear pads 22, 24 are adjusted by rotating the head 104 of the bushing 100 with a wrench or other tool corresponding to the shape of the head 104. The bore 110 through the bushing 100, and the corresponding bolt 114 through the bore 110, are offset from the longitudinal axis 108 of the bushing 100, to act as a cam when the bushing 100 is rotated about the bolt 114. As the bushing 100 is rotated, the body 106 portion exerts a force and causes the wear pads 22, 24 to move with a cam action. When the wear pads 22, 24 and corresponding gaps with the feed guide 12 are in a desired position, the nut 122 and bolt 114 may be tightened to retain the wear pads 22, 24 in their respective positions until a repositioning of the wear pads 22, 24 is desired.

In an alternate embodiment, the bushing 100 is inserted only through an aperture in the lower wear pad 22 for adjustment of the lower wear pad 22. The bolt 114 is inserted though the bushing 100, the internal wear plate, and the mounting slide 14. Rotation of the bushing 100 thereby adjusts only the lower wear pad 22 with a cam action.

In another embodiment, the body 106 of the bushing 100 is divided into a lower portion and an upper portion. The lower portion engages and interacts with the lower wear pad 22, while the upper portion engages and interacts with the internal wear plate 24. The lower and upper portions may be offset along two axes and therefore provide for a phased motion of the wear pad 22 and plate 24, for example to adjust one inwardly and the other outwardly at the same time. Alternatively, the lower and upper portions may lie along the same axis, but have different diameters, such that the wear pad 22 and wear plate 24 are adjusted in the same direction, but by differing distances.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, features of various implementing embodiments may be combined to form further embodiments of the invention.

What is claimed is:

1. An apparatus having an adjustment fastener and a drill feed guide wear pad on a drill feed guide, comprising:

an eccentric bolt having a head portion, a first shank portion and a second shank portion, the first and second shank portions offset collinearly, and a third shank portion between the first and second shank portions, the third shank portion offset collinearly from the first and second shank portions;

wherein the first shank portion is sized to fit within an aperture of the drill feed guide wear pad, and the second shank portion is sized to fit within the aperture of a mount on the drill feed guide, and the third shank portion is sized to fit within an aperture of a wear plate; and wherein the bolt is rotatable such that the first shank portion engages the drill feed guide wear pad and the second shank portion engages the mount aperture thereby providing a first camming action caused by the offset to position the drill feed guide wear pad relative to the mount, and such that the offset between the first and third shank portions provides a second camming action to position the wear pad and wear plate relative to one another.

2. The apparatus of claim 1 wherein the drill feed guide wear pad is at least partially wedge-shaped to define a first angled surface.

3. The apparatus of claim 2 wherein the drill feed guide comprises a second angled surface that engages the first angled surface.

4. The apparatus of claim 1 further comprising a threaded portion on the second shank portion, wherein the threaded portion is sized to engage a nut.

5. The apparatus of claim 1 wherein the drill feed guide wear pad includes a countersink, the countersink sized for the head portion of the eccentric bolt.

6. The apparatus of claim 1 wherein the first camming action and the second camming action occur approximately simultaneously.

7. The apparatus of claim 1 wherein at least one of the shank portions has a different diameter than the other of the shank portions.

8. The apparatus of claim 1 further comprising a shim pack configured to provide a gap between the drill feed guide wear pad and the wear plate.

9. The apparatus of claim 4 further comprising at least one washer disposed between the nut and the mount on the drill feed guide.

10. The apparatus of claim 1 wherein the head portion of the bolt is hexagonal for use with a tool.

11. An apparatus having an adjustment fastener and a drill feed guide wear pad on a drill feed guide, comprising:
   a bolt having a head portion, a first shank portion and a second shank portion, and a third shank portion between the first and second shank portions, the first, second and third shank portions offset collinearly from each other;
   wherein the first shank portion is sized to fit within an aperture of the drill feed guide wear pad, and the second shank portion is sized to fit within the aperture on the drill feed guide, and the third shank portion is sized to fit within an aperture of a wear plate;
   so that upon rotation of the bolt, the first shank portion and the second shank portion provide a first camming action to position the drill feed guide wear pad relative to the drill feed guide, and the first shank portion and the third shank portion provide a second camming action to position the drill feed guide wear pad and the wear plate relative to each other.

* * * * *